United States Patent
Luo

(10) Patent No.: US 11,917,525 B2
(45) Date of Patent: Feb. 27, 2024

(54) WIRELESS COMMUNICATION METHOD, APPARATUS, AND COMPUTER-READABLE STORAGE MEDIUM

(71) Applicant: Huawei Technologies Co., Ltd., Shenzhen (CN)

(72) Inventor: Jun Luo, Kista (SE)

(73) Assignee: Huawei Technologies Co., Ltd., Shenzhen (CN)

( * ) Notice: Subject to any disclaimer, the term of this patent is extended or adjusted under 35 U.S.C. 154(b) by 476 days.

(21) Appl. No.: 17/172,961

(22) Filed: Feb. 10, 2021

(65) Prior Publication Data

US 2021/0168699 A1 Jun. 3, 2021

Related U.S. Application Data

(63) Continuation of application No. PCT/CN2019/097628, filed on Jul. 25, 2019.

(30) Foreign Application Priority Data

Aug. 10, 2018 (CN) .......................... 201810912180.9

(51) Int. Cl.
*H04W 48/10* (2009.01)
*H04L 5/00* (2006.01)
(Continued)

(52) U.S. Cl.
CPC .......... *H04W 48/10* (2013.01); *H04L 5/0053* (2013.01); *H04W 48/16* (2013.01); *H04L 1/0079* (2013.01)

(58) Field of Classification Search
CPC ... H04W 56/00; H04W 74/08; H04W 74/002; H04W 74/0841; H04W 74/0891;
(Continued)

(56) References Cited

U.S. PATENT DOCUMENTS

2002/0146077 A1* 10/2002 Mower ................... H04L 27/22
375/259
2007/0049344 A1* 3/2007 Van Der Velde ..... H04W 48/12
455/560

(Continued)

FOREIGN PATENT DOCUMENTS

CN 1771745 A 5/2006
CN 102195745 A 9/2011
(Continued)

OTHER PUBLICATIONS

"3rd Generation Partnership Project;Technical Specification Group Radio Access Network;NR;Multiplexing and channel coding (Release 15)," 3GPP TS 38.212 V15.2.0, total 98 pages, 3rd Generation Partnership Project, Valbonne, France (Jun. 2018).
(Continued)

*Primary Examiner* — Nathan S Taylor
(74) *Attorney, Agent, or Firm* — Leydig, Voit & Mayer, Ltd.

(57) ABSTRACT

This application provides a wireless communication method, an apparatus, and a computer-readable storage medium. The method includes: A terminal receives a system message that is broadcast by an access network device on a physical broadcast channel PBCH, where the system message includes an extension field, and the extension field is used to indicate a format of the system message. The terminal discards the system message if information about the extension field is first information, where the first information is used to indicate that the format of the system message is an extended format. In this way, the terminal can select a proper manner to correctly process the system message.

17 Claims, 10 Drawing Sheets

(51) Int. Cl.
*H04W 48/16* (2009.01)
*H04L 1/00* (2006.01)

(58) Field of Classification Search
CPC ....... H04W 74/00; H04W 4/06; H04W 48/10;
H04W 48/12; H04W 48/16; H04W 88/06;
H04W 88/00; H04L 1/0071; H04L
1/0079; H04L 5/0053; H04L 69/323;
H04L 1/0027; H04L 1/0028; H04L 5/00;
H04L 1/00
USPC .......................................................... 370/32
See application file for complete search history.

(56) References Cited

U.S. PATENT DOCUMENTS

| | | | | |
|---|---|---|---|---|
| 2011/0026645 | A1* | 2/2011 | Luo | H04L 1/0038 |
| | | | | 455/226.1 |
| 2012/0170515 | A1* | 7/2012 | Patil | H04W 48/12 |
| | | | | 370/328 |
| 2014/0098761 | A1* | 4/2014 | Lee | H04W 24/02 |
| | | | | 370/329 |
| 2016/0255545 | A1 | 9/2016 | Gholmieh et al. | |
| 2017/0111913 | A1* | 4/2017 | Li | H04W 72/23 |
| 2017/0188319 | A1* | 6/2017 | Seo | H04W 56/001 |
| 2017/0367087 | A1* | 12/2017 | Seo | H04W 72/51 |
| 2018/0234954 | A1* | 8/2018 | Takeda | H04W 28/04 |
| 2019/0238289 | A1* | 8/2019 | Zhao | H04L 5/0048 |
| 2019/0274032 | A1* | 9/2019 | Chatterjee | H04L 5/00 |
| 2019/0305867 | A1* | 10/2019 | Tseng | H04L 5/0094 |
| 2019/0313428 | A1* | 10/2019 | Zhou | H04L 27/261 |

FOREIGN PATENT DOCUMENTS

| | | | | |
|---|---|---|---|---|
| CN | 102625260 | A | 8/2012 | |
| CN | 102958133 | A | 3/2013 | |
| CN | 103220796 | A | 7/2013 | |
| CN | 103298090 | A | 9/2013 | |
| CN | 105230094 | B | 1/2019 | |
| CN | 105612810 | B | 3/2019 | |
| EP | 1614306 | B1 | 6/2013 | |
| EP | 3105878 | B1 * | 4/2019 | H04L 1/00 |
| IN | 102223690 | A | 10/2011 | |
| WO | WO-2018232090 | A1 * | 12/2018 | H04B 7/0626 |

OTHER PUBLICATIONS

"3rd Generation Partnership Project;Technical Specification Group Radio Access Network; NR; Radio Resource Control (RRC) protocol specification (Release 15)," 3GPP TS 38.331 V15.2.1, total 303 pages, 3rd Generation Partnership Project, Valbonne, France (Jun. 2018).

* cited by examiner

| | | | |
|---|---|---|---|
| 0 | $SFN_1$ | 16 | Another field 2 ($Other_2$) |
| 1 | $SFN_2$ | 17 | Another field 3 ($Other_3$) |
| 2 | $SFN_3$ | 18 | Another field 4 ($Other_4$) |
| 3 | $SFN_4$ | 19 | Another field 5 ($Other_5$) |
| 4 | $SFN_5$ | 20 | Another field 6 ($Other_6$) |
| 5 | $SFN_6$ | 21 | Another field 7 ($Other_7$) |
| 6 | $SFN_7$ | 22 | Another field 8 ($Other_8$) |
| 7 | $SFN_8$ | 23 | Another field 9 ($Other_9$) |
| 8 | $SFN_9$ | 24 | Another field 10 ($Other_{10}$) |
| 9 | $SFN_{10}$ | 25 | Another field 11 ($Other_{11}$) |
| 10 | $HRF_1$ | 26 | Another field 12 ($Other_{12}$) |
| 11 | $SSB_1$ | 27 | Another field 13 ($Other_{13}$) |
| 12 | $SSB_2$ | 28 | Another field 14 ($Other_{14}$) |
| 13 | $SSB_3$ | 29 | Another field 15 ($Other_{15}$) |
| 14 | Extension field 1 ($choice_1$) | 30 | Another field 16 ($Other_{16}$) |
| 15 | Another field 1 ($Other_1$) | 31 | Another field 17 ($Other_{17}$) |

FIG. 13

| | | | |
|---|---|---|---|
| 0 | HRF$_1$ | 16 | SFN$_1$ |
| 1 | Extension field 1 (choice$_1$) | 17 | SFN$_4$ |
| 2 | SSB$_3$ | 18 | SFN$_3$ |
| 3 | SSB$_2$ | 19 | Another field 8 (Other$_8$) |
| 4 | Another field 1 (Other$_1$) | 20 | Another field 9 (Other$_9$) |
| 5 | SSB$_1$ | 21 | Another field 10 (Other$_{10}$) |
| 6 | SFN$_8$ | 22 | Another field 11 (Other$_{11}$) |
| 7 | SFN$_{10}$ | 23 | SFN$_2$ |
| 8 | SFN$_5$ | 24 | SFN$_9$ |
| 9 | Another field 2 (Other$_2$) | 25 | Another field 12 (Other$_{12}$) |
| 10 | SFN$_7$ | 26 | Another field 13 (Other$_{13}$) |
| 11 | Another field 3 (Other$_3$) | 27 | Another field 14 (Other$_{14}$) |
| 12 | Another field 4 (Other$_4$) | 28 | Another field 15 (Other$_{15}$) |
| 13 | Another field 5 (Other$_5$) | 29 | Another field 16 (Other$_{16}$) |
| 14 | Another field 6 (Other$_6$) | 30 | SFN$_6$ |
| 15 | Another field 7 (Other$_7$) | 31 | Another field 17 (Other$_{17}$) |

FIG. 14

WIRELESS COMMUNICATION METHOD, APPARATUS, AND COMPUTER-READABLE STORAGE MEDIUM

CROSS-REFERENCE TO RELATED APPLICATIONS

This application is a continuation of International Application No. PCT/CN2019/097628, filed on Jul. 25, 2019. which claims priority to Chinese Patent Application No. 201810912180.9, filed on Aug. 10, 2018. The disclosures of the aforementioned applications are hereby incorporated by reference in their entireties.

TECHNICAL FIELD

This application relates to the field of communications technologies, and in particular, to a wireless communication method, an apparatus, and a computer-readable storage medium.

BACKGROUND

A next-generation new radio (NR) communications system defined in the 3rd generation partnership project (3GPP) transmits a system message on a physical broadcast channel (PBCH).

In the prior art, the system message transmitted on the PBCH has a fixed format. A terminal reads a received system message in a preset manner. With development of communications technologies, a system message may subsequently have another format. In this case, if the terminal receives the system message in the another format, the terminal also reads the system message in the existing preset manner, and this results in an error.

SUMMARY

This application provides a wireless communication method, an apparatus, and a computer-readable storage medium, so that a terminal can correctly process a system message.

According to a first aspect, an embodiment of this application provides a wireless communication method. The method includes: A terminal receives a system message that is broadcast by an access network device on a physical broadcast channel PBCH, where the system message includes an extension field, and the extension field is used to indicate a format of the system message. The terminal discards the system message if information about the extension field is first information, where the first information is used to indicate that the format of the system message is an extended format.

Based on this solution, the system message received by the terminal includes the extension field, and the extension field is used to indicate the format of the system message. The format of the system message may be the extended format or a conventional format. The extended format is a format of a system message in a future communications technology. After receiving the system message, the terminal may determine the format of the system message based on the extension field, and select, based on the determined format of the system message, a manner to process the message. If the information about the extension field is the first information, it indicates that the format of the system message is the extended format. In this case, the terminal discards the system message. In this way, the terminal can select a proper manner to correctly process the system message.

In a possible design, the terminal processes the system message if the information about the extension field is second information, where the second information is used to indicate that the format of the system message is the conventional format.

As an example, the following provides several different implementations of the system message.

Implementation 1: A location of the extension field in the system message is not fixed.

Specifically, the system message includes the extension field, and the location of the extension field in the system message is not fixed. For example, in a specific example, the system message includes an indication field, used to indicate the location of the extension field in the system message. In another specific example, each time before broadcasting the system message, the access network device broadcasts an indication message, where the indication message is used to indicate the location of the extension field in the system message.

Implementation 2: The extension field is located at a fixed bit of the system message. Specifically, the system message includes the extension field, and the extension field is located at the fixed bit of the system message. For example, in a specific example, the fixed bit occupied by the extension field is the $15^{th}$ bit of the system message.

In a possible design, the information about the extension field may include the first information or the second information. The first information is used to indicate that the format of the system message is the extended format, and the second information is used to indicate that the format of the system message is the conventional format. In other words, when the information about the extension field is the first information, it indicates that the format of the system message is the extended format; or when the information about the extension field is the second information, it indicates that the format of the system message is the conventional format. For example, the first information is 1, and the second information is 0; or the first information is 0, and the second information is 1. In this way, the terminal can determine the format of the system message based on whether the information about the extension field in the system message is the first information or the second information.

Further, for the foregoing two implementations, optionally, the system message further includes a first field. Specifically, system message includes the first field and the extension field. In a specific example, the first field occupies the $1^{st}$ to the $14^{th}$ bits of the system message, and the extension field occupies the $15^{th}$ bit of the system message. The following provides several possible implementations of the first field.

In a possible implementation, if the information about the extension field is the first information, the first field includes some or all of the following fields: an SFN field, an HRF field, an SSB time index field, or an extension field. In an example, the first field includes any one of an SFN field, an HRF field, an SSB time index field, and an extension field. For example, the first field includes an SFN field. For another example, the first field includes an extension field. In another example, the first field includes more of an SFN field, an HRF field, an SSB time index field, and an extension field. For example, the first field includes an SFN field and an HRF field. For another example, the first field includes an HRF field, an SSB time index field, and an extension field. Examples are not listed herein.

In another possible implementation, the system message further includes a first field, where the first field occupies the $1^{st}$ to the $14^{th}$ bits of the system message. If the information about the extension field is the second information, the $1^{st}$ to the $10^{th}$ bits of the first field are an SFN field, the $11^{th}$ bit of the first field is an HRF field, and the $12^{th}$ to the $14^{th}$ bits of the first field are an SSB time index field. Optionally, the first field in the system message in the conventional format may further include another field, and the another field may be located at the $16^{th}$ bit of the first field or any one or more bits after the $16^{th}$ bit.

Based on any one of the foregoing embodiments, the system message received by the terminal is an interleaved system message. The method further includes: The terminal performs de-interleaving on the interleaved system message, to obtain a de-interleaved system message. Then, the terminal determines the extension field based on the de-interleaved system message. The terminal receives the interleaved system message, and a correlation of source symbol data in the interleaved system message is weakened. Therefore, the terminal may perform de-interleaving according to an inverse rule to recover the source symbol data. In addition, when burst errors occur in the system message, the terminal may correct the system message in which the errors occur. In this way, reliability and security of the system message can be improved.

According to a second aspect, an embodiment of this application provides a wireless communication method. The method includes: An access network device generates a system message, where the system message includes an extension field, and the extension field is used to indicate a format of the system message. The access network device broadcasts the system message on a PBCH.

Based on this solution, the system message generated by the access network device includes the extension field, and the extension field is used to indicate the format of the system message. After receiving the system message on the PBCH, the terminal may determine the format of the system message based on the extension field. The format of the system message may be an extended format or a conventional format. The extended format is a format of a system message in a future communications technology. After receiving the system message, the terminal may determine the format of the system message based on the extension field, and select, based on the determined format of the system message, a manner to process the message. For example, if the terminal determines that the format of the system message is the extended format, the terminal may discard the system message. For another example, if the terminal determines that the format of the system message is the conventional format, the terminal may process the system message in the existing manner. In this way, the terminal can select a proper manner to correctly process the system message.

As an example, the following provides several different implementations of the system message.

Implementation 1: A location of the extension field in the system message is not fixed.

Specifically, the system message includes the extension field, and the location of the extension field in the system message is not fixed. For example, in a specific example, the system message includes an indication field, used to indicate the location of the extension field in the system message. In another specific example, each time before broadcasting the system message, the access network device sends an indication message, where the indication message is used to indicate the location of the extension field in the system message.

Implementation 2: The extension field is located at a fixed bit of the system message.

Specifically, the system message includes the extension field, and the extension field is located at the fixed bit of the system message. For example, in a specific example, the fixed bit occupied by the extension field is the $15^{th}$ bit of the system message.

In a possible design, the information about the extension field may include the first information or the second information. The first information is used to indicate that the format of the system message is the extended format, and the second information is used to indicate that the format of the system message is the conventional format. In other words, when the information about the extension field is the first information, it indicates that the format of the system message is the extended format; or when the information about the extension field is the second information, it indicates that the format of the system message is the conventional format. For example, the first information is 1, and the second information is 0; or the first information is 0, and the second information is 1. In this way, the terminal can determine the format of the system message based on whether the information about the extension field in the system message is the first information or the second information.

Further, for the foregoing two implementations, optionally, the system message further includes a first field. Specifically, system message includes the first field and the extension field. In a specific example, the first field occupies the $1^{st}$ to the $14^{th}$ bits of the system message, and the extension field occupies the $15^{th}$ bit of the system message. The following provides several possible implementations of the first field.

In a possible implementation, if the information about the extension field is the first information, the first field includes some or all of the following fields: an SFN field, an HRF field, an SSB time index field, or an extension field. In an example, the first field includes any one of an SFN field, an HRF field, an SSB time index field, and an extension field. For example, the first field includes an SFN field. For another example, the first field includes an extension field. In another example, the first field includes more of an SFN field, an HRF field, an SSB time index field, and an extension field. For example, the first field includes an SFN field and an HRF field. For another example, the first field includes an HRF field, an SSB time index field, and an extension field. Examples are not listed herein.

In another possible implementation, if the information about the extension field is the second information, the $1^{st}$ to the $10^{th}$ bits of the first field are an SFN field, the $11^{th}$ bit of the first field is an HRF field, and the $12^{th}$ to the $14^{th}$ bits of the first field are an SSB time index field. Optionally, the first field in the system message in the conventional format may further include another field, and the another field may be located at the $16^{th}$ bit of the first field or any one or more bits after the $16^{th}$ bit.

Because the system message is transmitted on a channel, burst errors may occur, and the burst errors are usually caused by pulse interference and multipath fading and are statistically related. Therefore, once an uncorrectable error occurs, the error continuously exists; and consequently, the terminal cannot correct the system message in which the burst errors occur. Therefore, to improve security and reliability of transmitting the system message on the PBCH, after generating the system message, the access network device may further perform interleaving on the system message, to obtain an interleaved system message. Then, the access network device broadcasts the interleaved system message on the PBCH. In this way, a time sequence of source symbol data in the system message is disarranged through interleaving, so that a correlation of the source symbol data is weakened. The source symbol data is then sent on the channel, so that the terminal that receives the interleaved source symbol data can recover the source symbol data according to an inverse rule, and correct the system message in which the error occurs. In this way, reliability and security of the system message can be improved.

According to a third aspect, this application provides an apparatus. The apparatus provided in this application has a function of implementing behavior of the terminal or the access network device in the aspects of the foregoing methods, and includes a corresponding means (means) configured to perform the step or the function described in the aspects of the foregoing methods. The step or the function may be implemented by using software, hardware (for example, a circuit), or a combination of hardware and software.

In a possible design, the apparatus includes one or more processors and a communications unit. The one or more processors are configured to support the apparatus in performing a corresponding function of the terminal in the foregoing methods. For example, the terminal discards a system message if information about an extension field is first information, where the first information is used to indicate that a format of the system message is an extended format. The communications unit is configured to support communication between the apparatus and another device, to implement a receiving and/or a sending function, for example, receive a system message broadcast on a PBCH.

Optionally, the apparatus may further include one or more memories. The memory is configured to be coupled to the processor. The memory stores a program instruction and/or data necessary for the apparatus. The one or more memories may be integrated with the processor, or may be disposed independent of the processor. This is not limited in this application.

The apparatus may be an intelligent terminal, a wearable device, or the like. The communications unit may be a transceiver or a transceiver circuit. Optionally, the transceiver may alternatively be an input/output circuit or an interface.

The apparatus may alternatively be a communications chip. The communications unit may be an input/output circuit or an interface of the communications chip.

In another possible design, the apparatus includes a transceiver, a processor, and a memory. The processor is configured to control the transceiver or an input/output circuit to transmit and receive a signal, and the memory is configured to store a computer program. The processor is configured to run the computer program in the memory, so that the apparatus is enabled to perform the method completed by the terminal in any one of the first aspect or the possible implementations of the first aspect.

In a possible design, the apparatus includes one or more processors and a communications unit. The one or more processors are configured to support the apparatus in performing a corresponding function of the access network device in the foregoing methods, for example, generating a system message. The communications unit is configured to support communication between the apparatus and another device, to implement a receiving and/or a sending function, for example, broadcast a system message on a PBCH.

Optionally, the apparatus may further include one or more memories. The memory is configured to be coupled to the processor. The memory stores a program instruction and/or data necessary for the access network device. The one or more memories may be integrated with the processor, or may be disposed independent of the processor. This is not limited in this application.

The apparatus may be a base station, a gNB, a TRP, or the like. The communications unit may be a transceiver or a transceiver circuit. Optionally, the transceiver may alternatively be an input/output circuit or an interface.

The apparatus may alternatively be a communications chip. The communications unit may be an input/output circuit or an interface of the communications chip.

In another possible design, the apparatus includes a transceiver, a processor, and a memory. The processor is configured to control the transceiver or an input/output circuit to transmit and receive a signal, and the memory is configured to store a computer program. The processor is configured to run the computer program in the memory, so that the apparatus is enabled to perform the method completed by the access network device in any one of the second aspect or the possible implementations of the second aspect.

According to a fourth aspect, this application provides a system. The system includes the foregoing terminal and the foregoing access network device.

According to a fifth aspect, this application provides a computer-readable storage medium. The computer-readable storage medium is configured to store a computer program. The computer program includes an instruction used to perform the method according to any one of the first aspect or the possible implementations of the first aspect.

According to a sixth aspect, this application provides a computer-readable storage medium. The computer-readable storage medium is configured to store a computer program. The computer program includes an instruction used to perform the method according to any one of the second aspect or the possible implementations of the second aspect.

According to a seventh aspect, this application provides a computer program product. The computer program product includes computer program code. When the computer program code is run on a computer, the computer is enabled to perform the method according to any one of the first aspect or the possible implementations of the first aspect.

According to an eighth aspect, this application provides a computer program product. The computer program product includes computer program code. When the computer program code is run on a computer, the computer is enabled to perform the method according to any one of the second aspect or the possible implementations of the second aspect.

BRIEF DESCRIPTION OF DRAWINGS

FIG. 13 is a schematic diagram of fields in a to-be-interleaved system message according to an embodiment of this application;

FIG. 14 is a schematic diagram of fields in an interleaved system message according to an embodiment of this application;

DESCRIPTION OF EMBODIMENTS

Terms used in DESCRIPTION OF EMBODIMENTS of this application are only used to explain specific embodiments of this application, and are not intended to limit this application.

Figure 1:
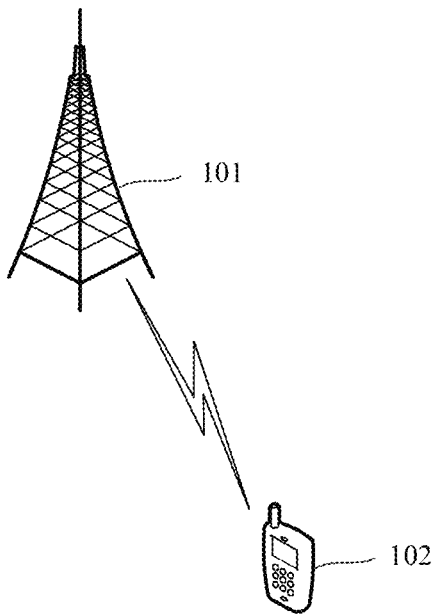
FIG. 1 is a schematic diagram of a network architecture of a communications system in which an embodiment of this application is used.

FIG. 1 is a schematic architectural diagram of a communications system in which an embodiment of this application is used. The communications system may include a base station and at least one terminal. The system architecture includes an access network device 101 and a terminal 102. The terminal 102 communicates with the access network device 101 by using a radio interface. For clarity, only one access network device and one terminal are shown in the figure.

The terminal is a device having a wireless transceiver function. The terminal may be deployed on land, including an indoor device, an outdoor device, a hand-held device, or a vehicle-mounted device; or may be deployed on a water surface (for example, on a ship); or may be deployed in air (for example, in an aircraft, a balloon, or a satellite). The terminal may be a mobile phone, a pad, a computer having a wireless transceiver function, a virtual reality (VR) terminal, an augmented reality (AR) terminal, a wireless terminal in industrial control, a wireless terminal in self driving, a wireless terminal in remote medical, a wireless terminal in a smart grid, a wireless terminal in transportation safety, a wireless terminal in a smart city, a wireless terminal in a smart home, or the like.

The access network (RAN) device is a device that provides a wireless communication function for the terminal. For example, the access network device includes but is not limited to: a next-generation base station (g nodeB, gNB) in 5G, an evolved NodeB (evolved node B, eNB), a radio network controller (RNC), a NodeB (node B, NB), a base station controller (BSC), a base transceiver station (BTS), a home base station (for example, a home evolved nodeB, or a home node B, HNB), a baseband unit (BBU), a transmitting and receiving point (TRP), a transmitting point (TP), a mobile switching center, and the like.

The following describes in detail a wireless communication method provided in this application with reference to the system architecture shown in FIG. 1.

Figure 2:
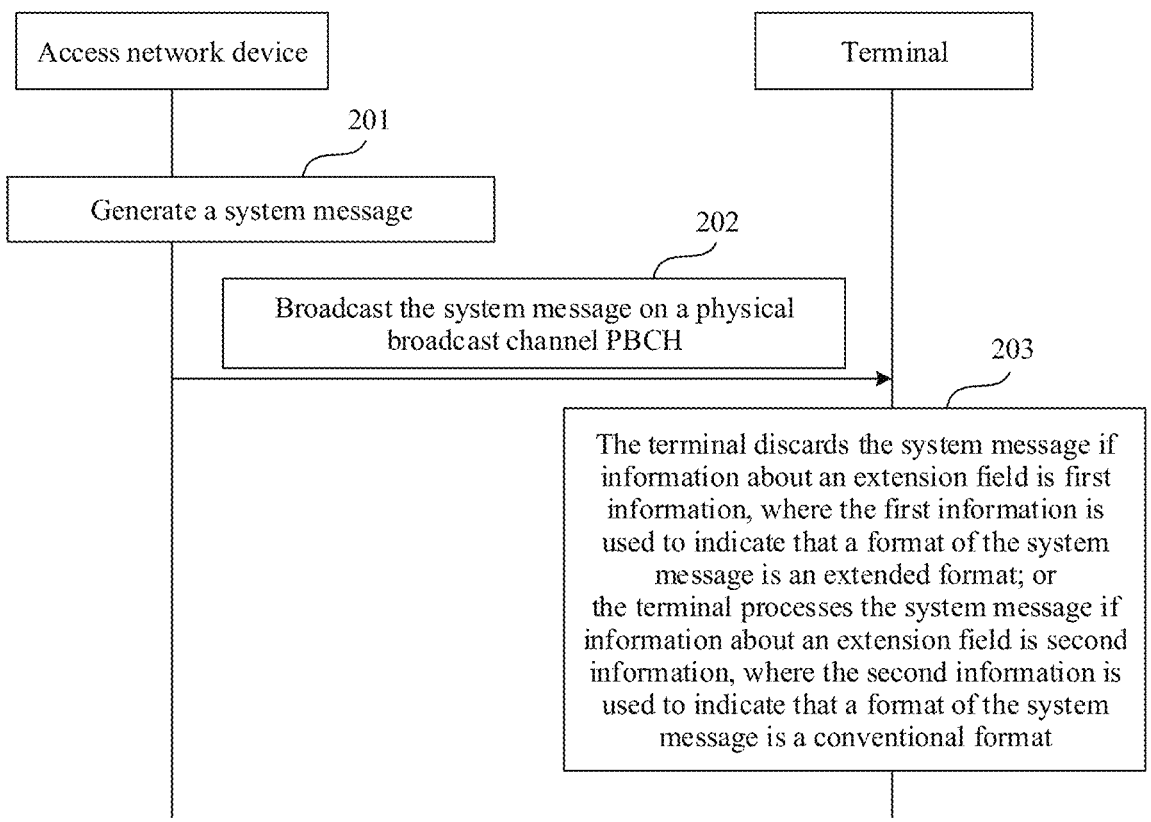
FIG. 2 is a schematic flowchart of a wireless communication method according to an embodiment of this application.

FIG. 2 is a schematic flowchart of a wireless communication method according to an embodiment of this application. The method includes the following steps.

Step 201: An access network device generates a system message.

The system message includes an extension field, and the extension field is used to indicate a format of the system message.

In this application, the format of the system message may be an extended format or a conventional format. The extended format is a format of a system message in a future communications technology.

In an optional implementation, information about the extension field may include first information and/or second information. The first information is used to indicate that the format of the system message is the extended format, and the second information is used to indicate that the format of the system message is the conventional format. In other words, when the information about the extension field is the first information, it indicates that the format of the system message is the extended format; or when the information about the extension field is the second information, it indicates that the format of the system message is the conventional format. For example, the first information is 1, and the second information is 0; or the first information is 0, and the second information is 1. In this way, the terminal can determine the format of the system message based on whether the information about the extension field in the system message is the first information or the second information.

In step 201, for a location of the extension field in the system message, the following implementations may be used.

Implementation 1: The location of the extension field in the system message is not fixed.

Specifically, the system message includes a first field and the extension field, and the location of the extension field in the system message is not fixed. For example, in a specific example, the system message includes an indication field, used to indicate the location of the extension field in the system message. In another specific example, each time before broadcasting the system message, the access network device sends an indication message, where the indication message is used to indicate the location of the extension field in the system message. In this implementation, the location of the extension field in the system message is not fixed; and consequently, a quantity of interactions between the terminal and the access network device is increased, and power consumption of the terminal is increased.

Implementation 2: The extension field is located at a fixed bit of the system message.

Specifically, the system message includes the extension field, and the extension field is located at the fixed bit of the system message. For example, in a specific example, the fixed bit occupied by the extension field is the 15$^{th}$ bit of the system message.

In this implementation, the terminal may determine the extension field at the fixed bit, so that the terminal can determine, without determining other information in the system message, the format of the system message based on whether the information about the extension field is the first information or the second information. In this way, the power consumption of the terminal can be reduced.

Step 202: The access network device broadcasts the system message on a PBCH. Correspondingly, the terminal may receive the system message on the PBCH.

Step 203: The terminal discards the system message if the information about the extension field is the first information, where the first information is used to indicate that the format of the system message is the extended format; or the terminal processes the system message if the information about the extension field is the second information, where the second information is used to indicate that the format of the system message is the conventional format.

Herein, optionally, the first information may be used to indicate the conventional format, and the second information may be used to indicate the extended format; or the second information may be used to indicate the conventional format, and the first information may be used to indicate the extended format.

Specifically, the terminal may determine the format of the system message based on the information about the extension field in the received system message. For example, the first information is 1, and the second information is 0. In this case, if the terminal determines that the information about the extension field is 1, the terminal determines that the format of the system message is the extended format; or if the terminal determines that the information about the extension field is 0, the terminal determines that the format of the system message is the conventional format.

For another example, the first information is 0, and the second information is 1. In this case, if the terminal determines that the information about the extension field is 0, the terminal determines that the format of the system message is the extended format; or if the terminal determines that the information about the extension field is 1, the terminal determines that the format of the system message is the conventional format.

In step 201 to step 203, the system message generated by the access network device includes the extension field, and the extension field is used to indicate the format of the system message. After receiving the system message on the PBCH, the terminal may determine the format of the system message based on the extension field. The format of the system message may be the extended format or the conventional format. The extended format is the format of the system message in the future communications technology. After receiving the system message, the terminal may determine the format of the system message based on the extension field, and select, based on the determined format of the system message, a manner to process the message. If the terminal determines that the format of the system message is the extended format, the terminal may discard the system message; or if the terminal determines that the format of the system message is the conventional format, the terminal may process the system message in the existing manner. In this way, the terminal can select a proper manner to correctly process the system message.

Based on the foregoing solution, further, the system message in step 201 may further include the first field. In an example, the first field occupies the 1$^{st}$ to the 14$^{th}$ bits of the system message.

In a specific implementation, the system message specifically includes the first field, the extension field, and another field. Alternatively, the system message specifically includes the first field and another field. The another field includes an extension field.

The first field may include some or all of a system frame number (SFN) field, a half radio frame (HRF) field, and a synchronization signal/PBCH block (SSB) time index (SSB time index) field, or may further include an extension field. Optionally, a new field may be introduced to the future communications technology. The first field may further include the new field introduced to the future communications system.

With reference to Table 1 and Table 2, the following describes the first field and the another field by using examples.

For example, the system message includes MIB information (also referred to as L2 information, refer to Table 1) and time-related load information (also referred to as L1 information, refer to Table 2). It is assumed that the system message in step 201 includes a first field and another field.

The first field includes an SFN field in the L2 information shown in Table 1, and an SFN field, an HRF field, and an SSB time index field in the L1 information shown in Table 2.

The another field may include the following information in the L2 information shown in Table 1: subcarrier spacings (sub-carrier spacing common) of various messages, where the various messages include a system information block 1 (system information block type1, SIB1) message, other system information (other system information, OSI), signaling 2 or signaling 4 (MSG2/4) in a random access procedure, and the like; a configuration parameter of downlink control information of remaining minimum system information (RMSI); a subcarrier offset (ssb-sub carrier offset) from an SSB to a common resource block; a position (demodulation reference signals-type A-position, Dmrs-type A-position) of a demodulation reference signal type A; configuration information (pdcch-configSIB1) in the downlink control information; cell access barred indication information (cell barred); an intra-frequency and reselection (intra freq reselection) field; a spare (spare) field; and the like.

TABLE 1

Quantity of bits corresponding to a field included in L2 information

| Field | Quantity of bits |
|---|---|
| SFN | 6 |
| sub-carrier spacing common | 1 |
| pdcch-configSIB1 | 4 |
| Dmrs-type A-position | 1 |
| pdcch-configSIB1 | 8 |
| cell barred | 1 |
| intra freq reselection | 1 |
| spare | 1 |

TABLE 2

Quantity of bits corresponding to a field included in L1 information

| Field | Quantity of bits |
|---|---|
| SFN | 4 |
| Half radio frame | 1 |
| SSB time index for L = 64, Reserve for L = 4/8 | 3 |

Based on the foregoing embodiment, the system message in the conventional format is different from the system message in the extended format, where information about an extension field included in the system message in the conventional format is the second information, and information about an extension field included in the extended format is the first information. Based on system messages in different formats, the following provides several possible implementations of the first field.

In a possible implementation, if the information about the extension field is the second information, that is, the system message is in the conventional format, the $1^{st}$ to the $10^{th}$ bits of the first field are an SFN field, the $11^{th}$ bit of the first field is an HRF field, and the $12^{th}$ to the $14^{th}$ bits of the first field are an SSB time index field. Optionally, the first field in the system message in the conventional format may further include another field, and the another field may be located at the $16^{th}$ bit of the first field or any one or more bits after the $16^{th}$ bit. The following shows an example of the system message in the conventional format.

Figure 3:
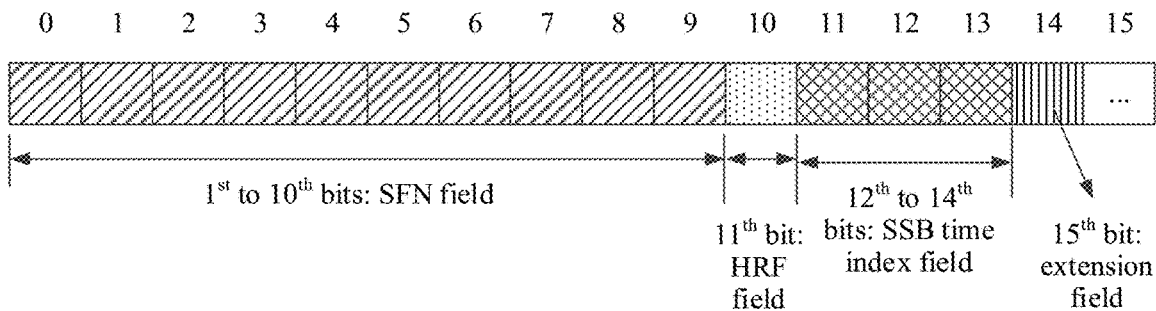
FIG. 3 is a schematic diagram of a system message in a conventional format according to an embodiment of this application.

FIG. 3 is a schematic diagram of a system message in a conventional format according to an embodiment of this application.

The system message in the conventional format includes a first field, an extension field, and another field. The first field is located at the first 14 bits. Specifically, the $1^{st}$ to the $10^{th}$ bits are an SFN field, the $11^{th}$ bit is an HRF field, and the $12^{th}$ to the $14^{th}$ bits are an SSB time index field. The extension field is located at the $15^{th}$ bit. The another field (not shown in the figure) is located at the $16^{th}$ bit or any one or more bits after the $16^{th}$ bit.

In another possible implementation, if the information about the extension field is the first information, that is, the system message is in the extended format, the first field includes some or all of the following fields: an SFN field, an HRF field, an SSB time index field, or an extension field. For the first field, the following several optional implementations may be included.

Manner a1: The first field includes all of an SFN field, an HRF field, and an SSB time index field, and there may be any combination of bits occupied by the three fields.

For example, the system message includes a first field located at the $1^{st}$ to the $14^{th}$ bits and an extension field located at the $15^{th}$ bit. The $1^{st}$ to the $10^{th}$ bits of the first field are an SFN field, the $11^{th}$ bit of the first field is an HRF field, and the $12^{th}$ to the $14^{th}$ bits of the first field are an SSB time index field. Sameness between the system message in the extended format in this example and the system message in the conventional format in FIG. 3 is that the two system messages include the same first field. A difference is that the two system messages include the different extension fields. The information about the extension field in the system message in the extended format is the first information, and the information about the extension field in the system message in the conventional format is the second information.

Figure 4:
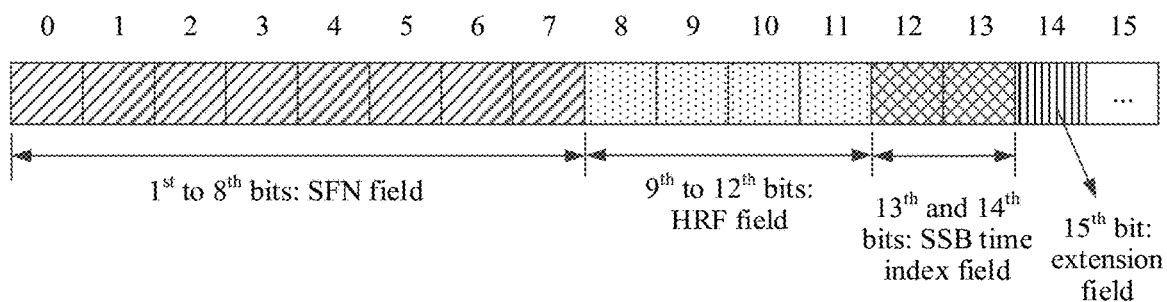
FIG. 4 is a schematic diagram of another system message in an extended format according to an embodiment of this application.

For another example, referring to a system message in an extended format shown in FIG. 4, the system message includes a first field located at the $1^{st}$ to the $14^{th}$ bits and an extension field located at the $15^{th}$ bit. The $1^{st}$ to the $8^{th}$ bits of the first field are an SFN field, the $9^{th}$ to the $12^{th}$ bits of the first field are an HRF field, and the $13^{th}$ and the $14^{th}$ bits of the first field are an SSB time index field.

Manner a2: The first field includes any two of an SFN field, an HRF field, and an SSB time index field, and there may be any combination of bits occupied by the two fields.

Figure 5:
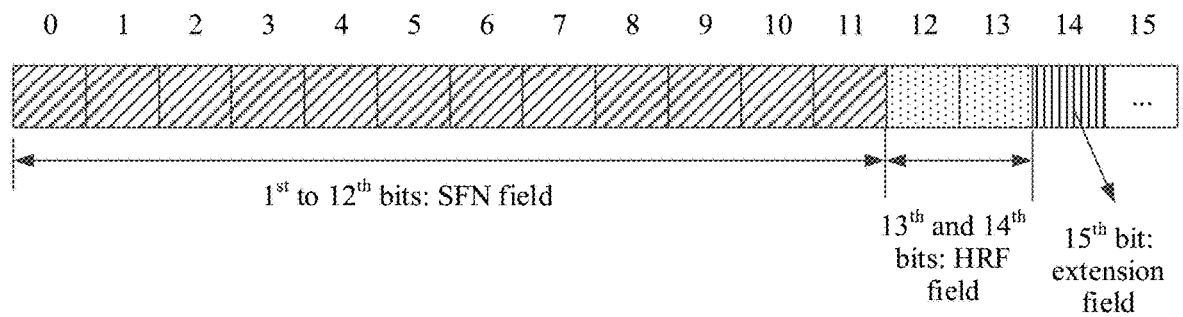
FIG. 5 is a schematic diagram of another system message in an extended format according to an embodiment of this application.

For example, the first field includes an SFN field and an HRF field. Referring to a system message in an extended format shown in FIG. 5, the system message includes a first field located at the $1^{st}$ to the $14^{th}$ bits and an extension field located at the $15^{th}$ bit. The $1^{st}$ to the $12^{th}$ bits of the first field are an SFN field, and the $13^{th}$ and the $14^{th}$ bits of the first field are an HRF field.

Figure 6:
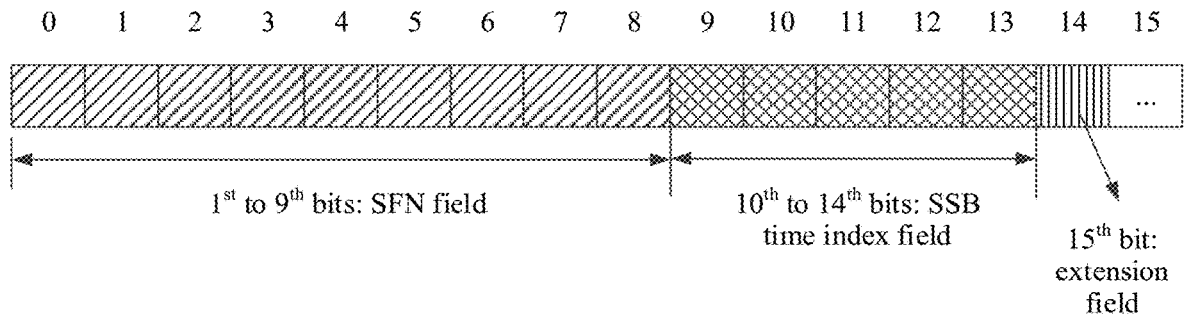
FIG. 6 is a schematic diagram of another system message in an extended format according to an embodiment of this application.

For another example, the first field includes an SFN field and an SSB time index field. Referring to a system message in an extended format shown in FIG. 6, the system message includes a first field located at the $1^{st}$ to the $14^{th}$ bits and an extension field located at the $15^{th}$ bit. The $1^{st}$ to the $9^{th}$ bits of the first field are an SFN field, and the $10^{th}$ to the $14^{th}$ bits of the first field are an SSB time index field.

Manner a3: The first field includes any one of an SFN field, an HRF field, and an SSB time index field, and another field, and there may be any combination of bits occupied by the field and the another field.

Figure 7:
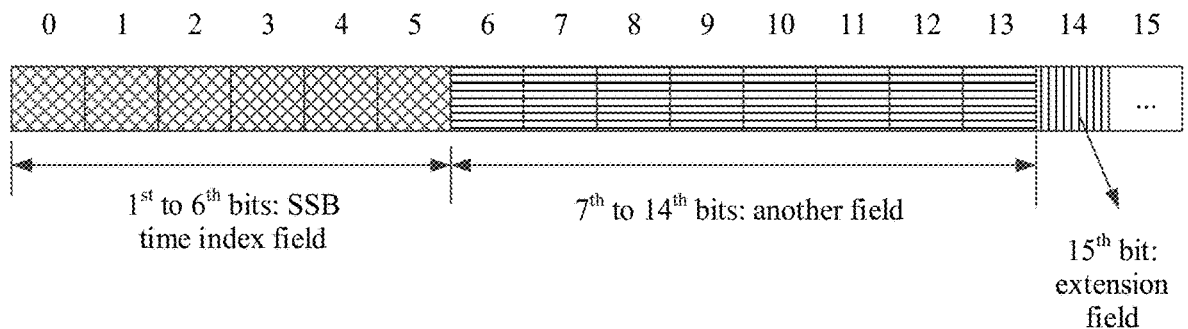
FIG. 7 is a schematic diagram of another system message in an extended format according to an embodiment of this application.

For example, the first field includes an SSB time index field and another field. Referring to a system message in an extended format shown in FIG. 7, the system message includes a first field located at the $1^{st}$ to the $14^{th}$ bits and an extension field located at the $15^{th}$ bit. The $1^{st}$ to the $6^{th}$ bits of the first field are an SSB time index field, and the $7^{th}$ to the $14^{th}$ bits of the first field are another field and an extension field.

Manner a4: The first field includes any one of an SFN field, an HRF field, and an SSB time index field.

Figure 8:
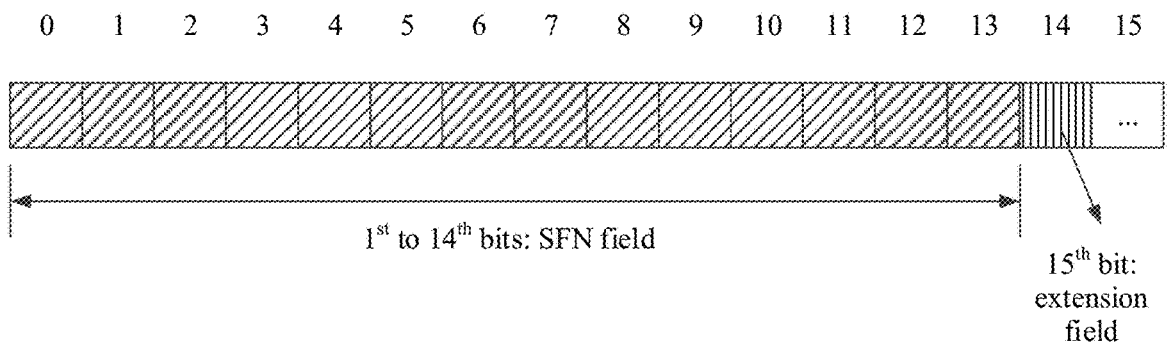
FIG. 8 is a schematic diagram of another system message in an extended format according to an embodiment of this application.

For example, the first field includes an SFN field, but does not include an HRF field, an SSB time index field, an extension field, and another field. Referring to a system message in an extended format shown in FIG. 8, the system message includes a first field located at the $1^{st}$ to the $14^{th}$ bits and an extension field located at the $15^{th}$ bit. The first field includes an SFN field located at the $1^{st}$ to the $14^{th}$ bits.

Figure 9:
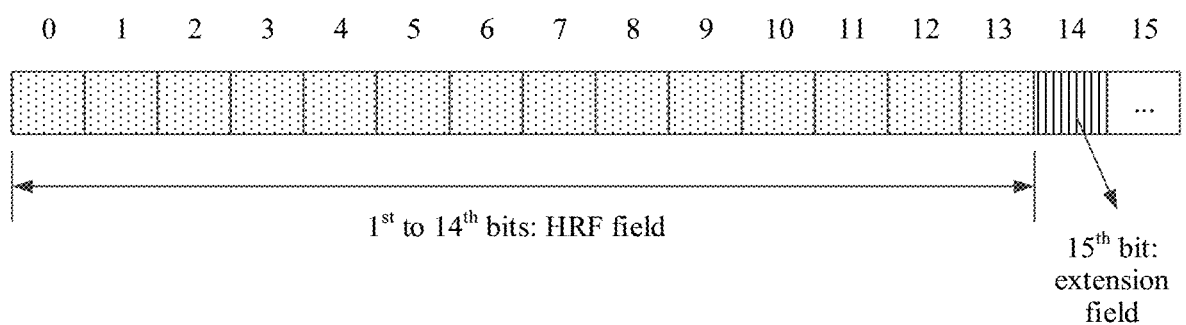
FIG. 9 is a schematic diagram of another system message in an extended format according to an embodiment of this application.

For another example, the first field includes an HRF field, but does not include an SFN field, an SSB time index field, an extension field, and another field. Referring to a system message in an extended format shown in FIG. 9, the system message includes a first field located at the $1^{st}$ to the $14^{th}$ bits and an extension field located at the $15^{th}$ bit. The first field includes an HRF field located at the $1^{st}$ to the $14^{th}$ bits.

Figure 10:
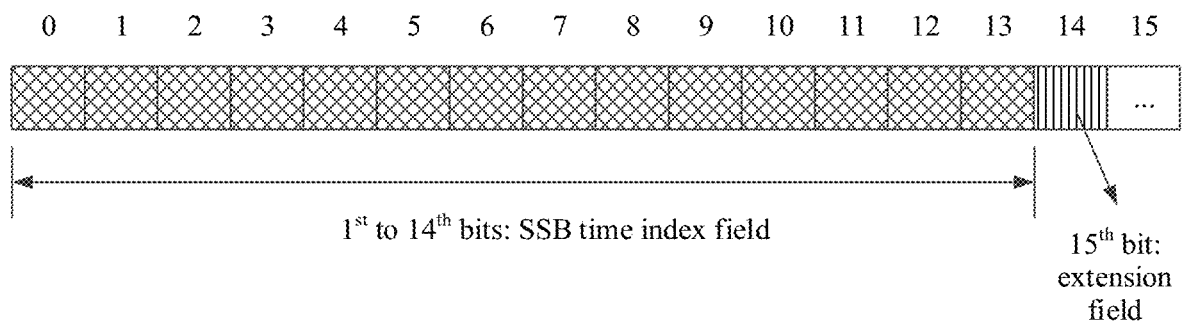
FIG. 10 is a schematic diagram of another system message in an extended format according to an embodiment of this application.

For another example, the first field includes an SSB time index field, but does not include an SFN field, an HRF field, an extension field, and another field. Referring to a system message in an extended format shown in FIG. 10, the system message includes a first field located at the $1^{st}$ to the $14^{th}$ bits and an extension field located at the $15^{th}$ bit. The first field includes an SSB time index field located at the $1^{st}$ to the $14^{th}$ bits.

Manner a5: The first field includes an extension field, but does not include any one of an SFN field, an HRF field, and an SSB time index field.

Figure 11:
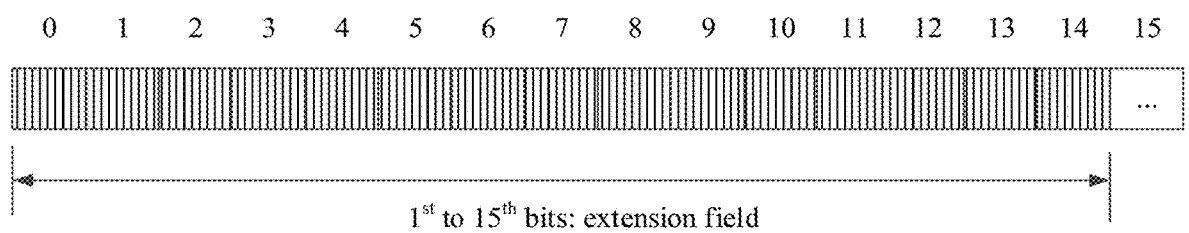
FIG. 11 is a schematic diagram of another system message in an extended format according to an embodiment of this application.

For example, the first field includes an extension field, but does not include an SFN field, an HRF field, an SSB time index field, and another field. Referring to FIG. 11, a system message includes a first field located at the $1^{st}$ to the $14^{th}$ bits and an extension field located at the $15^{th}$ bit. The first field includes an extension field located at the $1^{st}$ to the $14^{th}$ bits, but does not include an SFN field, an HRF field, an SSB time index field, and another field.

Figure 12:
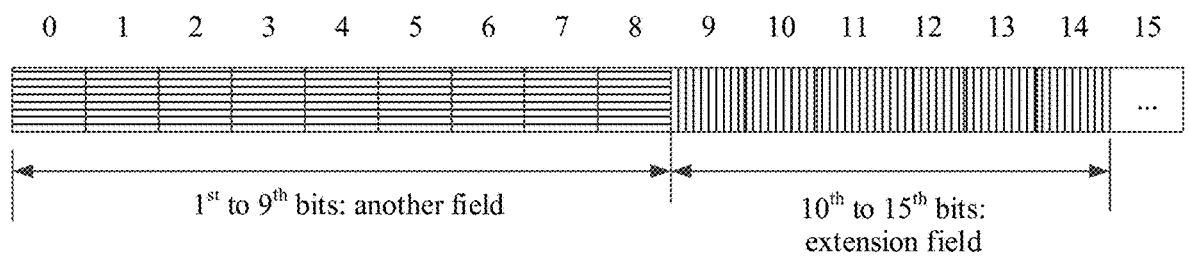
FIG. 12 is a schematic diagram of another system message in an extended format according to an embodiment of this application.

For another example, the first field includes an extension field and another field, but does not include an SFN field, an HRF field, and an SSB time index field. Referring to a system message in an extended format shown in FIG. 12, the system message includes a first field located at the $1^{st}$ to the $14^{th}$ bits and an extension field located at the $15^{th}$ bit. The first field includes another field located at the $1^{st}$ to the $9^{th}$ bits and an extension field located at the $10^{th}$ to the $14^{th}$ bits. In this example, there may alternatively be another combination of bits occupied by the extension field and the another field. For example, the $1^{st}$ to the $5^{th}$ bits of the first field are the another field, and the $6^{th}$ to the $14^{th}$ bits of the first field are the extension field. Examples are not listed herein.

Based on any one of the foregoing embodiments, because the system message is transmitted on a channel, burst errors may occur, and the burst errors are usually caused by pulse interference and multipath fading and are statistically related. Therefore, once an uncorrectable error occurs, the error continuously exists; and consequently, the terminal cannot correct the system message in which the burst errors occur. Therefore, to improve security and reliability of transmitting the system message on the PBCH, after step 201, the access network device may perform interleaving on the system message, to obtain an interleaved system message. Then, the access network device broadcasts the interleaved system message on the PBCH.

Correspondingly, the terminal receives the interleaved system message, and performs de-interleaving on the interleaved system message, to obtain a de-interleaved system message. Then, the terminal determines the extension field based on the de-interleaved system message. Then, the terminal performs step 203 based on the extension field. In this way, a time sequence of source symbol data in the system message is disarranged through interleaving, so that a correlation of the source symbol data is weakened. The source symbol data is then sent on the channel, so that the terminal that receives the interleaved source symbol data can recover the source symbol data according to an inverse rule, and correct the system message in which the error occurs. In this way, reliability and security of the system message can be improved.

The following describes a method for interleaving a system message by using an example.

As an example, according to a PBCH payload (payload) interleaving method defined in the 3GPP standard protocol TS 38.212, all fields in the L1 information and the L2 information are interleaved in a sequence of an SFN field, an HRF field, an SSB time index field, and another field.

In the following Example 1, a first field in the system message includes a 10-bit SFN field, a 1-bit HRF field, and a 3-bit SSB time index field. A is used to represent a total quantity of bits of the L1 information and the L2 information, $\overline{A}$ represents a quantity of bits of the L2 information, and a quantity of bits of the L1 information is 8. For example, if $\overline{A}$ is equal to 64, A is equal to 72. For a specific manner of determining an interleaving sequence number j of each bit in the system message, refer to the following Example 1:

Let $A = \overline{A}+8; j_{SFN}=0; j_{HRF}=10; j_{SSB}=11; j_{other}=14;$ [1]

for $i=0$ to $i=A-1$ [2]

if $\overline{a}_i$ is an SFN bit [3]

$a_{G[j_{SFN}]} = \overline{a}_i;$ [4]

$j_{SFN} = j_{SFN}+1;$ [5]

else if $\overline{a}_i$ is the half radio frame bit [6]

$a_{G[j_{HRF}]} = \overline{a}_i;$ [7]

else if $\overline{A}+5 \le i \le A+7$ [8]

$a_{G[j_{SSB}]} = \overline{a}_i;$ [9]

$j_{SSB} = j_{SSB}+1;$ [10]

else [11]

$a_{G[j_{other}]} = \overline{a}_i;$ [12]

$j_{other} = j_{other}+1;$ [13]

end if
end for

In row [1] of Example 1, $j_{SFN}=0$ indicates that a start sequence number of the SFN field in an interleaving sequence is 0. Because the SFN field occupies 10 bits, sequence numbers 0 to 9 are the SFN field. $j_{HRF}=10$ indicates that a start sequence number of the HRF field in the interleaving sequence is 10. Because the HRF field occupies one bit, a sequence number 10 is the HRF field. $j_{SSB}=11$ indicates that a start sequence number of the HRF field in the interleaving sequence is 11. Because the SSB time index field occupies three bits, sequence numbers 11 to 13 are the SSB time index field. $j_{other}=14$ indicates that a start sequence number of the another (other) field in the interleaving sequence is 14. Because $\overline{A}=64$, A=72. Therefore, sequence numbers 14 to 71 are the another field. In rows [2] to [5], the SFN field in the system message is traversed, and the SFN field occupies the sequence numbers 0 to 9. In rows [6] and [7], the HRF field in the system message is traversed, and the HRF field occupies the sequence number 10. In rows [8] to [10], the SSB time index field in the system message is traversed, and the SSB time index field occupies the sequence numbers 11 to 13. In rows to [13], the another field in the system message is traversed, and the another field occupies the sequence number 14 and a sequence number after the sequence number 14.

According to the sequence numbers of the fields in the interleaving sequence in Example 1, interleaving is performed in an interleaving manner shown in the following Table 3. The following uses only one group of 32 bits for interleaving as an example. As shown in Table 3, j is a to-be-interleaved sequence number, and G(j) is an interleaved sequence number.

TABLE 3

| PBCH payload interleaving method | |
|---|---|
| j | G(j) |
| 0 | 16 |
| 1 | 23 |
| 2 | 18 |
| 3 | 17 |
| 4 | 8 |
| 5 | 30 |
| 6 | 10 |
| 7 | 6 |
| 8 | 24 |
| 9 | 7 |
| 10 | 0 |
| 11 | 5 |
| 12 | 3 |
| 13 | 2 |

TABLE 3-continued

PBCH payload interleaving method

| j | G(j) |
|---|------|
| 14 | 1 |
| 15 | 4 |
| 16 | 9 |
| 17 | 11 |
| 18 | 12 |
| 19 | 13 |
| 20 | 14 |
| 31 | 15 |
| 22 | 19 |
| 23 | 20 |
| 24 | 21 |
| 25 | 22 |
| 26 | 25 |
| 27 | 26 |
| 28 | 27 |
| 29 | 28 |
| 30 | 29 |
| 31 | 31 |

With reference to FIG. 13 and FIG. 14, the following describes a process of interleaving fields in a system message.

FIG. 13 is a schematic diagram of fields in a to-be-interleaved system message according to an embodiment of this application.

As shown in FIG. 13, only some fields in the system message are shown as an example. Before interleaving, sequence numbers 0 to 9 are a 10-bit SFN field ($HRF_1$, $HRF_2$, and $HRF_{10}$), a sequence number 10 is a 1-bit HRF field, sequence numbers 11 to 13 are a 3-bit SSB time index field (represented by $SSB_1$, $SSB_2$, and $SSB_3$ in the figure), a sequence number 14 is a 1-bit extension field (represented by $choice_1$ in the figure), and sequence numbers 15 to 31 are another 17-bit field (represented by $other_1$, $other_2$, . . . , and $other_{17}$ in the figure). Fields in the to-be-interleaved system message shown in FIG. 13 are interleaved according to the foregoing Table 3, where a to-be-interleaved sequence number is j, and an interleaved sequence number is G(j), so that a schematic diagram of fields in an interleaved system message shown in FIG. 14 is obtained.

As shown in FIG. 14, in the interleaved system message, a 10-bit SFN field is located at sequence numbers 16, 23, 18, 17, 8, 30, 10, 6, 24, and 7, a 1-bit HRF field is located at a sequence number 0, a 3-bit SSB time index field is located at sequence numbers 5, 3, and 2, a 1-bit extension field is located at a sequence number 1, and another 17-bit field is located at sequence numbers 4, 9, 11 to 15, 19 to 29, and 31.

It can be learned that, a sequence of bits of the fields in the interleaved system message is disarranged, and a sequence correlation between bits of a same field is weakened, so that reliability and security of the system message can be improved.

With reference to FIG. 13 and FIG. 14, after generating the system message, the access network device performs, according to Table 3, interleaving on the bits of the fields in FIG. 13 based on G(j) obtained by interleaving j, to obtain the interleaved system message shown in FIG. 14; and sends the interleaved system message to the terminal. Correspondingly, after receiving the interleaved system message shown in FIG. 14, the terminal performs, according to Table 3, reverse de-interleaving based on G(j), to obtain j, so that the de-interleaved system message shown in FIG. 13 is obtained.

Further, because the 1-bit extension field ($choice_1$) is arranged at the $15^{th}$ bit, the terminal only needs to check whether the $15^{th}$ bit of the de-interleaved system message is the first information. If the $15^{th}$ bit of the de-interleaved system message is the first information, it indicates that the system message is the system message in the extended format. In this case, the terminal discards the system message in the extended format. If the $15^{th}$ bit of the de-interleaved system message is not the first information, it indicates that the system message is the system message in the conventional format. In this case, the terminal may continue to process the system message in the conventional format. In this way, the terminal can select a proper manner to correctly process the system message.

Figure 15:
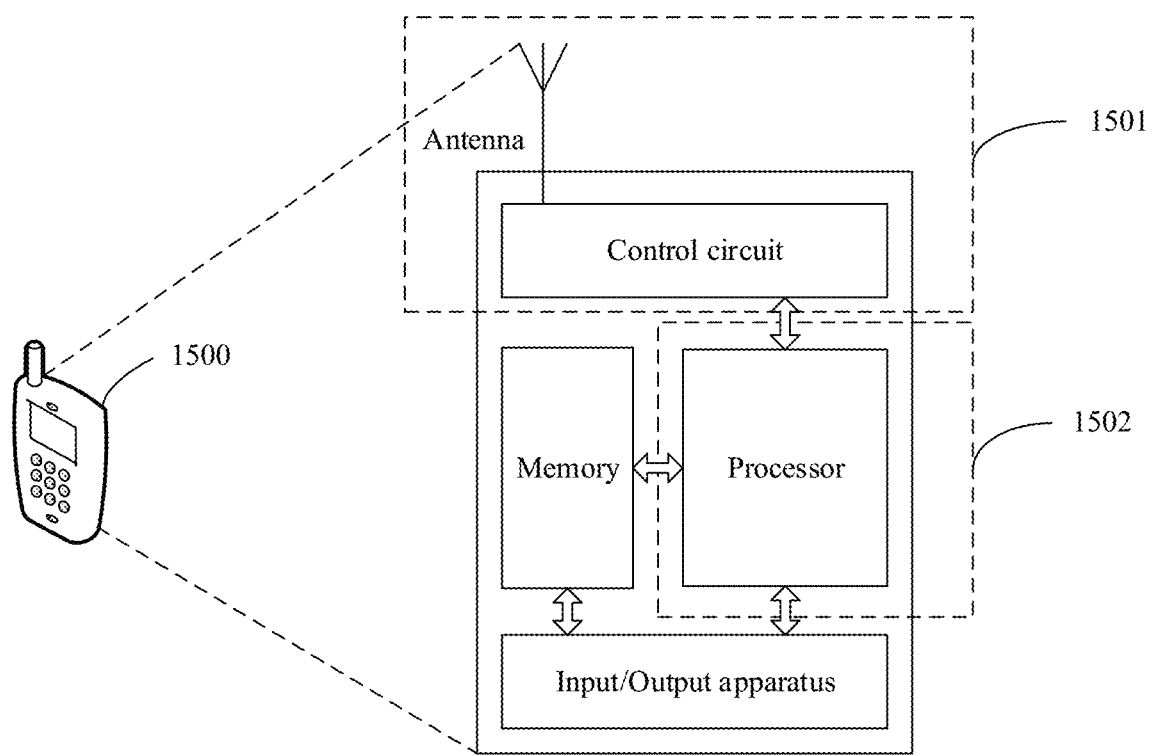
FIG. 15 is a schematic structural diagram of a terminal according to an embodiment of this application.

FIG. 15 is a schematic structural diagram of a terminal according to an embodiment of this application. The terminal can be used in the system shown in FIG. 1, to perform a function of the terminal in the foregoing method embodiments. For ease of description, FIG. shows only main components of the terminal. As shown in FIG. 15, a terminal 1500 includes a processor, a memory, a control circuit, an antenna, and an input/output apparatus. The processor is mainly configured to: process a communications protocol and communications data, control the entire terminal, execute a software program, and process data of the software program, for example, is configured to support the terminal in performing the action described in the foregoing method embodiments. For example, the terminal discards a system message if information about an extension field is first information, where the first information is used to indicate that a format of the system message is an extended format; or the terminal processes a system message if information about an extension field is second information, where the second information is used to indicate that a format of the system message is a conventional format. The memory is mainly configured to store the software program and the data, for example, store related information of the system message described in the foregoing embodiments. The control circuit is mainly configured to: perform conversion between a baseband signal and a radio frequency signal, and process the radio frequency signal. A combination of the control circuit and the antenna may also be referred to as a transceiver that is mainly configured to transmit and receive a radio frequency signal in a form of an electromagnetic wave. The input/output apparatus, such as a touchscreen, a display, or a keyboard, is mainly configured to: receive data entered by a user and output data to the user.

After the terminal is powered on, the processor can read a software program in a storage unit, interpret and execute an instruction of the software program, and process data of the software program. When data needs to be sent wirelessly, the processor performs baseband processing on the to-be-sent data, and then outputs a baseband signal to a radio frequency circuit. The radio frequency circuit performs radio frequency processing on the baseband signal, and then sends, by using the antenna, a radio frequency signal in an electromagnetic wave form. When data is sent to the terminal, the radio frequency circuit receives a radio frequency signal by using the antenna, converts the radio frequency signal into a baseband signal, and outputs the baseband signal to the processor. The processor converts the baseband signal into data, and processes the data.

A person skilled in the art may understand that, for ease of description, FIG. 15 shows only one memory and only one processor. In an actual terminal, there may be a plurality of processors and a plurality of memories. The memory may also be referred to as a storage medium, a storage device, or the like. This is not limited in this embodiment of this application.

In an optional implementation, the processor may include a baseband processor and/or a central processing unit. The baseband processor is mainly configured to process the communications protocol and the communications data. The central processing unit is mainly configured to: control the entire terminal, execute the software program, and process the data of the software program. Functions of the baseband processor and the central processing unit may be integrated into the processor in FIG. 15. A person skilled in the art may understand that the baseband processor and the central processing unit each may be an independent processor, and are interconnected by using a technology such as a bus. The person skilled in the art may understand that the terminal may include a plurality of baseband processors to adapt to different network standards, and the terminal may include a plurality of central processing units to enhance a processing capability of the terminal. All components of the terminal may be connected by using various buses. The baseband processor may also be expressed as a baseband processing circuit or a baseband processing chip. The central processing unit may also be expressed as a central processing circuit or a central processing chip. A function of processing the communications protocol and the communications data may be built in the processor, or may be stored in the storage unit in a form of a software program. The processor executes the software program to implement a baseband processing function.

In this embodiment of this application, the antenna that has a transceiver function and the control circuit may be considered as a communications unit 1501 of the terminal 1500. For example, the communications unit 1501 is configured to support the terminal in performing the receiving function and the sending function described in FIG. 2. The processor that has a processing function is considered as a processing unit 1502 of the terminal 1500. As shown in FIG. 4, the terminal 1500 includes the communications unit 1501 and the processing unit 1502. The communications unit may also be referred to as a transceiver, a transceiver machine, a transceiver apparatus, or the like. Optionally, a component configured to implement the receiving function in the communications unit 1501 may be considered as a receiving unit. A component configured to implement the sending function in the communications unit 1501 may be considered as a sending unit. In other words, the communications unit 1501 includes the receiving unit and the sending unit. The receiving unit may also be referred to as a receiver, an input port, a receiving circuit, or the like. The sending unit may be referred to as a transmitting machine, a transmitter, a transmitting circuit, or the like.

The processing unit 1502 may be configured to execute an instruction stored in the memory, to control the communications unit 1501 to receive and/or send a signal, thereby completing the function of the terminal in the foregoing method embodiments. In an implementation, it may be considered that a function of the communications unit 1501 is implemented by using a transceiver circuit or a transceiver-dedicated chip.

Figure 16:
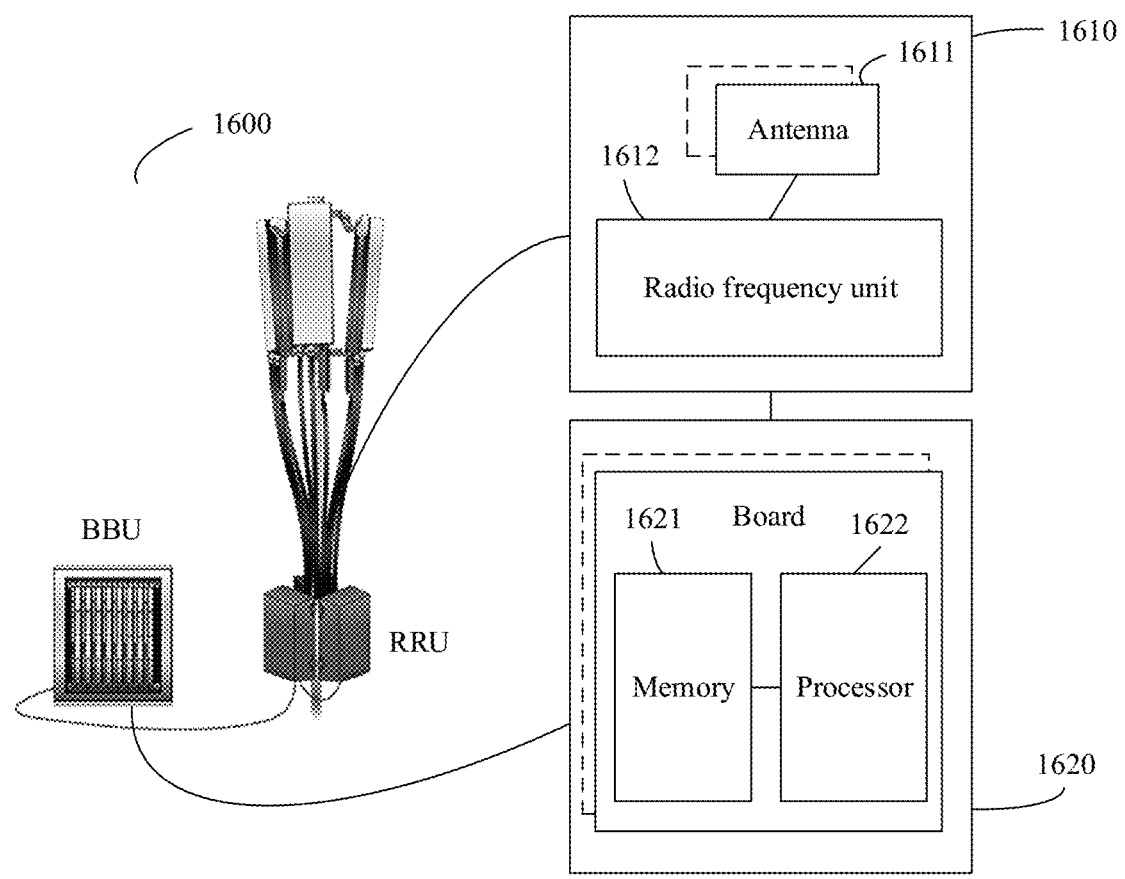
FIG. 16 is a schematic structural diagram of an access network device according to an embodiment of this application.

FIG. 16 is a schematic structural diagram of an access network device according to an embodiment of this application, for example, may be a schematic structural diagram of a base station. As shown in FIG. 16, the base station may be used in the system shown in FIG. 1, to perform a function of the access network device in the foregoing method embodiments. A base station 1600 may include one or more radio frequency units, such as a remote radio unit (remote radio unit, RRU) 1610 and one or more baseband units (baseband unit, BBU) (which may also be referred to as digital unit, digital unit, DU) 1620. The RRU 1610 may be referred to as a communications unit, a transceiver unit, a transceiver machine, a transceiver circuit, a transceiver, or the like, and may include at least one antenna 1611 and a radio frequency unit 1612. The RRU 1610 is mainly configured to: transmit and receive a radio frequency signal, and perform conversion between a radio frequency signal and a baseband signal, for example, configured to send the system message in the foregoing embodiments to a terminal. The BBU 1620 is mainly configured to: perform baseband processing, control a base station, and the like. The RRU 1610 and the BBU 1620 may be physically disposed together, or may be physically disposed separately, namely, a distributed base station.

The BBU 1620 is a control center of the base station, may also be referred to as a processing unit, and is mainly configured to complete baseband processing functions such as channel coding, multiplexing, modulation, and spectrum spreading. For example, the BBU (the processing unit) 1620 may be configured to control the base station to perform operation procedures related to the access network device in the foregoing method embodiments.

In an example, the BBU 1620 may include one or more boards, and a plurality of boards may jointly support a radio access network (such as an LTE network) of a single access standard, or may separately support radio access networks (such as an LTE network, a 5G network, and another network) of different access standards. The BBU 1620 further includes a memory 1621 and a processor 1622. The memory 1621 is configured to store a necessary instruction and necessary data. For example, the memory 1621 stores the system message and the interleaving-related information in the foregoing embodiments. The processor 1622 is configured to control the base station to perform a necessary action. For example, the processor 1622 is configured to control the base station to perform the operation procedures related to the access network device in the foregoing method embodiments. The memory 1621 and the processor 1622 may serve one or more boards. In other words, a memory and a processor may be separately disposed on each board. Alternatively, a plurality of boards may share a same memory and a same processor. In addition, a necessary circuit may be further disposed on each board.

Figure 17:
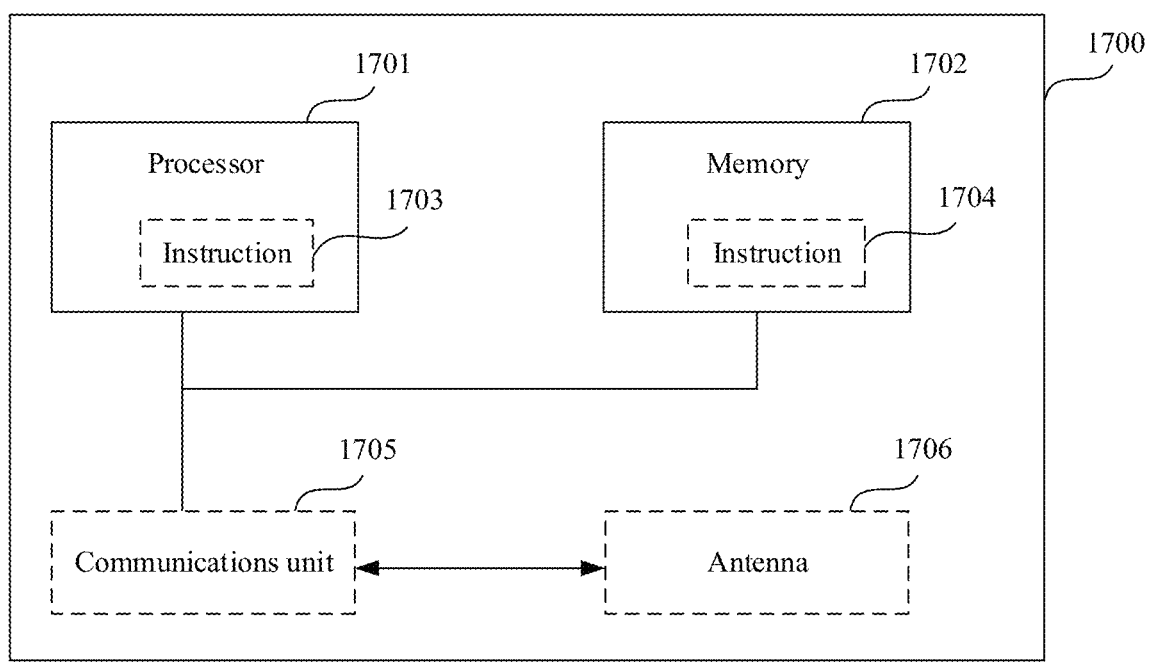
FIG. 17 is a schematic structural diagram of an apparatus according to an embodiment of this application.

FIG. 17 is a schematic structural diagram of an apparatus 1700. The apparatus 1700 may be configured to implement the method described in the foregoing method embodiments. For details, refer to the descriptions in the foregoing method embodiments. The communications apparatus 1700 may be a chip, an access network device (for example, a base station), a terminal, another network device, or the like.

The communications apparatus 1700 includes one or more processors 1701. The processor 1701 may be a general-purpose processor, a special-purpose processor, or the like. For example, the processor 1701 may be a baseband processor or a central processing unit. The baseband processor may be configured to process a communications protocol and communications data. The central processing unit may be configured to: control a communications apparatus (for example, a base station, a terminal, or a chip), execute a software program, and process data of the software program. The communications apparatus may include a communications unit, configured to input (receive) and output (send) a signal. For example, the communications apparatus may be a chip, and the communications unit may be an input and/or output circuit or a communications interface of the chip. The chip may be used for a terminal, an access network device (for example, a base station), or another network device. For another example, the communications apparatus may be a terminal, an access network device (for example, a base station), or another network device, and the communications unit may be a transceiver, a radio frequency chip, or the like.

The communications apparatus 1700 includes one or more processors 1701. The one or more processors 1701 may implement the method performed by the access network device or the terminal in the embodiment shown in FIG. 2.

In a possible design, the communications apparatus 1700 includes a means (means) configured to generate a system message and a means (means) configured to broadcast the system message. Functions of the means configured to generate the system message and the means configured to broadcast the system message may be implemented by using the one or more processors. For example, the system message may be generated by using the one or more processors, and the system message is broadcast by using the transceiver, an input/output circuit, or an interface of the chip. For the system message, refer to related descriptions in the foregoing method embodiments.

In a possible design, the communications apparatus 1700 includes a means (means) configured to receive a system message and a means (means) configured to determine, based on information about an extension field in the system message, to process or discard the system message. For details, refer to related descriptions in the foregoing method embodiments. For example, the system message may be received by using the transceiver, an input/output circuit, or an interface of the chip, and may be determined, by using the one or more processors based on the information about the extension field in the system message, to be processed or discarded.

Optionally, the processor 1701 may further implement another function in addition to the method in the embodiment shown in FIG. 2.

Optionally, in a design, the processor 1701 may execute instructions, so that the communications apparatus 1700 performs the method described in the foregoing method embodiments. All or some of the instructions, for example, an instruction 1703, may be stored in the processor, or all or some of the instructions, for example, an instruction 1704, may be stored in a memory 1702 coupled to the processor. Alternatively, the communications apparatus 1700 may be enabled, by using both instructions 1703 and 1704, to perform the method described in the foregoing method embodiments.

In another possible design, the communications apparatus 1700 may alternatively include a circuit. The circuit may implement a function of the access network device or the terminal in the foregoing method embodiments.

In another possible design, the communications apparatus 1700 may include one or more memories 1702 that store an instruction 1704. The instruction may be run on the processor, so that the communications apparatus 1700 performs the method described in the foregoing method embodiments. Optionally, the memory may further store data. Optionally, the processor may also store an instruction and/or data. For example, the one or more memories 1702 may store the correspondence described in the foregoing embodiments, or the related parameter or table provided in the foregoing embodiments. The processor and the memory may be separately disposed, or may be integrated together.

In another possible design, the communications apparatus 1700 may further include a communications unit 1705 and an antenna 1706. The processor 1701 may be referred to as a processing unit, and controls the communications apparatus (a terminal or an access network device). The communications unit 1705 may be referred to as a transceiver unit, a transceiver machine, a transceiver circuit, a transceiver, or the like, and is configured to implement a transceiver function of the communications apparatus by using the antenna 1706.

This application further provides a communications system. The communications system includes the foregoing one or more access network devices and the foregoing one or more terminals.

It should be noted that the processor in the embodiments of this application may be an integrated circuit chip, and has a signal processing capability. In an implementation process, the steps in the foregoing method embodiments may be completed by using a hardware integrated logic circuit in the processor or an instruction in a form of software. The processor may be a general-purpose processor, a digital signal processor (Digital Signal Processor, DSP), an application-specific integrated circuit (Application Specific Integrated Circuit, ASIC), a field programmable gate array (Field Programmable Gate Array, FPGA) or another programmable logic device, a discrete gate or transistor logic device, or a discrete hardware component. The processor may implement or perform the methods, the steps, and logical block diagrams that are disclosed in the embodiments of this application. The general-purpose processor may be a microprocessor, or the processor may be any conventional processor or the like. The steps in the methods disclosed with reference to the embodiments of this application may be directly performed and completed through a hardware decoding processor, or may be performed and completed through a combination of hardware in the decoding processor and a software module. The software module may be located in a mature storage medium in the art, such as a random access memory, a flash memory, a read-only memory, a programmable read-only memory, an electrically erasable programmable memory, or a register. The storage medium is located in a memory, and the processor reads information in the memory and completes the steps in the foregoing methods in combination with the hardware of the processor.

It may be understood that, in the embodiments of this application, the memory may be a volatile memory or a non-volatile memory, or may include both a volatile memory and a non-volatile memory. The non-volatile memory may be a read-only memory (ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (Random Access Memory, RAM), used as an external cache. Through example but not limitative description, many forms of RAMs may be used, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchlink dynamic random access memory (Synchlink DRAM, SLDRAM), and a direct rambus random access memory (Direct Rambus RAM, DR RAM). It should be noted that the memory of the systems and methods described in this specification includes but is not limited to these memories and any memory of another proper type.

All or some of the foregoing embodiments may be implemented by using software, hardware, firmware, or any combination thereof. When software is used for implementation, all or some of the embodiments may be implemented in a form of computer program product. The computer program product includes one or more computer instructions. When the computer program instructions are loaded and executed on a computer, all or some of the procedures or functions according to this application are generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a solid-state disk (for example, a solid-state disk Solid State Disk), or the like.

The various illustrative logical units and circuits described in the embodiments of this application may implement or operate the described functions by using a general-purpose processor, a digital signal processor, an application-specific integrated circuit (ASIC), a field programmable gate array (FPGA) or another programmable logical apparatus, a discrete gate or transistor logic, a discrete hardware component, or a design of any combination thereof. The general-purpose processor may be a microprocessor. Optionally, the general-purpose processor may alternatively be any conventional processor, controller, microcontroller, or state machine. The processor may alternatively be implemented by a combination of computing apparatuses, such as a digital signal processor and a microprocessor, a plurality of microprocessors, one or more microprocessors in combination with a digital signal processor core, or any other similar configuration.

Steps of the methods or algorithms described in the embodiments of this application may be directly embedded into hardware, a software unit executed by a processor, or a combination thereof. The software unit may be stored in a RAM memory, a flash memory, a ROM memory, an EPROM memory, an EEPROM memory, a register, a hard disk, a removable magnetic disk, a CD-ROM, or a storage medium of any other form in the art. For example, the storage medium may be connected to the processor, so that the processor can read information from the storage medium and write information to the storage medium. Optionally, the storage medium may further be integrated into the processor. The processor and the storage medium may be disposed in an ASIC, and the ASIC may be disposed in a terminal. Optionally, the processor and the storage medium may alternatively be disposed in different components of a terminal.

The computer program instructions may alternatively be loaded onto a computer or another programmable data processing device, so that a series of operations and steps are performed on the computer or another programmable device, to generate computer-implemented processing. Therefore, the instructions executed on the computer or the another programmable device provide steps for implementing a specific function in one or more procedures in the flowcharts and/or in one or more blocks in the block diagrams.

Although this application is described with reference to specific features and the embodiments thereof, apparently, various modifications and combinations may be made to this application without departing from the spirit and scope of this application. Correspondingly, the specification and the accompanying drawings are merely example descriptions of this application defined by the appended claims, and are intended to cover any of or all modifications, variations, combinations, or equivalents within the scope of this application. Obviously, a person skilled in the art can make various modifications and variations to this application without departing from the spirit and scope of this application. This application is intended to cover these modifications and variations of this application provided that they fall within the scope of the claims of this application and their equivalent technologies.

What is claimed is:

1. A wireless communication method, comprising:
 receiving, by a terminal, a system message that is broadcast by an access network device on a physical broadcast channel (PBCH), wherein the system message comprises an extension field, and the extension field indicates a format of the system message; and
 discarding, by the terminal, the system message when it is determined information about the extension field is first information, wherein the first information indicates that the format of the system message is an extended format, wherein the system message received by the terminal is an interleaved system message, and further performing de-interleaving on the interleaved system message, to obtain a de-interleaved system message; and
 determining the extension field based on the de-interleaved system message.

2. The method according to claim 1, wherein the method further comprises:
 processing, by the terminal, the system message if information about the extension field is second information, wherein the second information indicates that the format of the system message is a conventional format.

3. The method according to claim 2, wherein the system message further comprises a first field, and the first field occupies the $1^{st}$ to the $14^{th}$ bits of the system message; and
 if the information about the extension field is the second information, the $1^{st}$ to the $10^{th}$ bits of the first field are a system frame number (SFN) field, the $11^{th}$ bit of the first field is a half radio frame (HRF) field, and the $12^{th}$ to the $14^{th}$ bits of the first field are a synchronization signal and PBCH block (SSB) time index field.

4. The method according to claim 1, wherein the extension field is located at a fixed bit of the system message.

5. The method according to claim 4, wherein the fixed bit occupied by the extension field is the $15^{th}$ bit of the system message.

6. The method according to claim 1, wherein the system message further comprises a first field; and
 if the information about the extension field is the first information, the first field comprises some or all of the following fields:

a system frame number (SFN) field, a half radio frame (HRF) field, a synchronization signals and PBCH block (SSB) time index field, or an extension field.

7. An apparatus, comprising:
a receiver, in coordination with a processor, configured to receive a system message that is broadcast by an access network device on a physical broadcast channel (PBCH), wherein the system message comprises an extension field, and the extension field indicates a format of the system message; and
wherein the processor, configured to discard the system message when it is determined that information about the extension field is first information, wherein the first information indicates that the format of the system message is an extended format, wherein the system message received by the apparatus is an interleaved system message, and the processing unit is further configured to:
perform de-interleaving on the interleaved system message, to obtain a de-interleaved system message; and
determine the extension field based on the de-interleaved system message.

8. The apparatus according to claim 7, wherein the processor is further configured to:
process the system message if information about the extension field is second information, wherein the second information indicates that the format of the system message is a conventional format.

9. The apparatus according to claim 7, wherein the extension field is located at a fixed bit of the system message.

10. The apparatus according to claim 9, wherein the fixed bit occupied by the extension field is the $15^{th}$ bit of the system message.

11. The apparatus according to claim 7, wherein the system message further comprises a first field, and the first field occupies the $1^{st}$ to the $14^{th}$ bits of the system message; and
if the information about the extension field is the second information, the $1^{st}$ to the $10^{th}$ bits of the first field are a system frame number (SFN) field, the $11^{th}$ bit of the first field is a half radio frame (HRF) field, and the $12^{th}$ to the $14^{th}$ bits of the first field are a synchronization signal and PBCH block (SSB) time index field.

12. The apparatus according to claim 7, wherein the system message further comprises a first field; and if the information about the extension field is the first information, the first field comprises some or all of the following fields:
a system frame number (SFN) field, a half radio frame (HRF) field, a synchronization signal and PBCH block (SSB) time index field, or an extension field.

13. An apparatus, comprising:
a processing unit, configured to generate a system message, wherein the system message comprises an extension field, and the extension field indicates a format of the system message; and
a communications unit, configured to, in coordination with the processing unit, broadcast the system message on a physical broadcast channel (PBCH), wherein the extension field is located at a fixed bit of the system message and the fixed bit occupied by the extension field is the $15^{th}$ bit of the system message.

14. The apparatus according to claim 13, wherein if information about the extension field is first information, the format of the system message is an extended format; or
if information about the extension field is second information, the format of the system message is a conventional format.

15. The apparatus according to claim 14, wherein the system message further comprises a first field; and if the information about the extension field is the second information, the $1^{st}$ to the $10^{th}$ bits of the first field are a system frame number (SFN) field, the $11^{th}$ bit of the first field is a half radio frame (HRF) field, and the $12^{th}$ to the $14^{th}$ bits of the first field are a synchronization signal and PBCH block (SSB) time index field.

16. The apparatus according to claim 14, wherein the system message further comprises a first field; and if the information about the extension field is the first information, the first field comprises some or all of the following fields:
a system frame number (SFN) field, a half radio frame (HRF) field, a synchronization signal and PBCH block (SSB) time index field, or an extension field.

17. The apparatus according to claim 13, wherein the processing unit is further configured to:
perform interleaving on the system message, to obtain an interleaved system message; and
the communications unit is further configured to:
broadcast the interleaved system message on the PBCH.

* * * * *

UNITED STATES PATENT AND TRADEMARK OFFICE
CERTIFICATE OF CORRECTION

PATENT NO. : 11,917,525 B2
APPLICATION NO. : 17/172961
DATED : February 27, 2024
INVENTOR(S) : Jun Luo It is certified that error appears in the above-identified patent and that said Letters Patent is hereby corrected as shown below:

In the Claims

Claim 6: Column 23, Line 2: "(HRF) field, a synchronization signals and PBCH block" should read -- (HRF) field, a synchronization signal and PBCH block --.

Signed and Sealed this
Fourth Day of June, 2024

Katherine Kelly Vidal
Director of the United States Patent and Trademark Office